(12) United States Patent
Zoratti

(10) Patent No.: US 6,674,394 B1
(45) Date of Patent: Jan. 6, 2004

(54) METHOD FOR DETERMINING OBJECT LOCATION FROM SIDE-LOOKING SENSOR DATA

(75) Inventor: Paul K. Zoratti, South Lyon, MI (US)

(73) Assignee: Visteon Global Technologies, Inc., Dearborn, MI (US)

(*) Notice: Subject to any disclaimer, the term of this patent is extended or adjusted under 35 U.S.C. 154(b) by 0 days.

(21) Appl. No.: 10/401,428

(22) Filed: Mar. 28, 2003

(51) Int. Cl.[7] .......................... G01S 13/00; B60T 7/16; B62D 1/24; G06F 17/10; B60Q 1/00
(52) U.S. Cl. .................. 342/70; 180/169; 701/301; 340/436
(58) Field of Search ............... 342/70, 71; 340/435, 340/436, 992; 180/167, 168, 169; 701/96, 223, 301

(56) References Cited

U.S. PATENT DOCUMENTS

| | | | | |
|---|---|---|---|---|
| 4,349,823 A | * | 9/1982 | Tagami et al. ............ 342/70 |
| 5,325,096 A | | 6/1994 | Pakett |
| 5,339,075 A | | 8/1994 | Abst et al. |
| 5,517,196 A | | 5/1996 | Pakett et al. |
| 5,583,495 A | * | 12/1996 | Ben Lulu ............... 340/904 |
| 6,025,796 A | * | 2/2000 | Crosby, II .............. 342/70 |
| 6,121,916 A | * | 9/2000 | McDade ............... 342/70 |
| 6,243,024 B1 | | 6/2001 | Yamabuchi et al. |
| 6,265,968 B1 | * | 7/2001 | Betzitza et al. .......... 340/436 |
| 6,377,167 B1 | * | 4/2002 | Juds et al. ............. 340/435 |
| 6,396,435 B1 | * | 5/2002 | Fleischhauer et al. ..... 342/70 |
| 6,400,308 B1 | | 6/2002 | Bell et al. |
| 6,452,534 B1 | * | 9/2002 | Zoratti et al. ........... 342/70 |
| 6,509,863 B2 | | 1/2003 | Zoratti et al. |
| 6,522,287 B1 | * | 2/2003 | Stopczynski ........... 342/70 |
| 2003/0025597 A1 | | 2/2003 | Schofield |

* cited by examiner

Primary Examiner—Thomas H. Tarcza
Assistant Examiner—Brian Andrea
(74) Attorney, Agent, or Firm—MacMillan, Sobanski & Todd LLC

(57) ABSTRACT

An object location of a 3-D object to a side of a transportation vehicle is classified wherein the transportation vehicle moves along a front-to-rear directional axis and has a remote sensor mounted at a predetermined reference point. A set of detection points is identified substantially to the side of the transportation vehicle using the remote sensor. A detection point is found having a closest range to the vehicle reference point. The object is classified as on-center if a position $Y_{near}$ along the directional axis corresponding to the closest-range detection point is within a predetermined threshold distance from a position $Y_{zero}$ along the directional axis corresponding to the predetermined reference point. If not on-center, then the object is classified as spanning if a first position $Y_1$ along the directional axis and a second position $Y_2$ along the directional axis are on opposite sides of the position $Y_{zero}$. If not spanning, then the object is classified as front if any particular detection point is forward of the position $Y_{zero}$. If not spanning, then the object is classified as rear if any particular detection point is rearward of the position $Y_{zero}$.

14 Claims, 5 Drawing Sheets

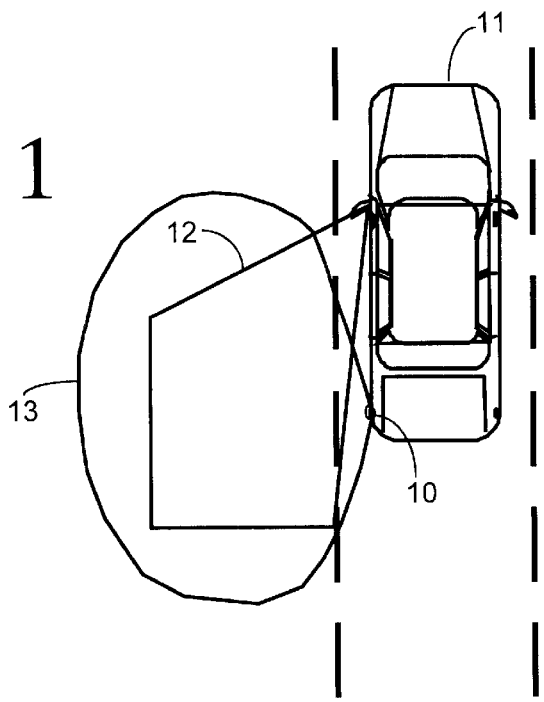
Fig. 1
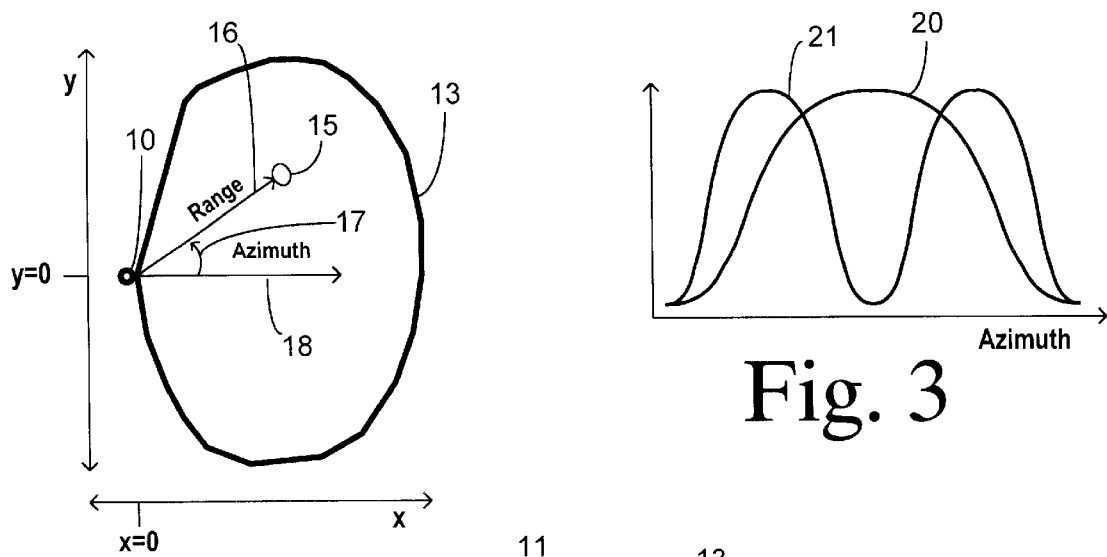
Fig. 2
Fig. 3
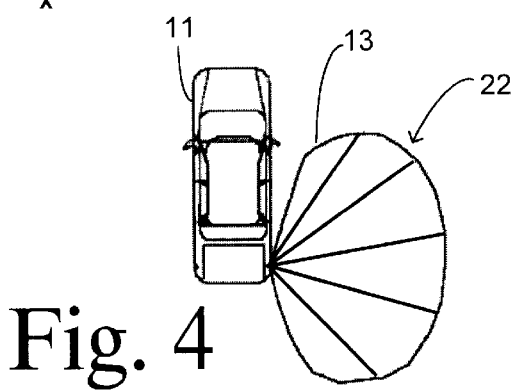
Fig. 4

METHOD FOR DETERMINING OBJECT LOCATION FROM SIDE-LOOKING SENSOR DATA

CROSS REFERENCE TO RELATED APPLICATIONS

This application is related to U.S. application Ser. No. 10/402,836 entitled "Stopped Object Filtering For Side Object Detection System," and U.S. application Ser. No. 10/402,043 entitled "Method for Determining Object Classification from Side-Looking Sensor Data," both filed concurrently herewith and incorporated herein by reference in their entirety.

STATEMENT REGARDING FEDERALLY SPONSORED RESEARCH

Not Applicable.

BACKGROUND OF THE INVENTION

The present invention relates in general to side object detection systems for motor vehicles, and, more specifically, to determining a location of objects within a detection zone based on a limited number of detection points from a remote sensor that provides an incomplete boundary of an object.

Automotive systems known as side object detection systems (SODS) utilize "side-looking" remote sensors for such applications as blind-spot detection and lane change aid. These applications are designed to alert the driver to potential hazards, e.g., objects that may be located adjacent to the host vehicle. The remote sensors may employ radar transceivers, light sensors, ultrasonic sensors, and other technologies.

One objective of the side-looking sensors is to identify the presence and location of objects within a predetermined zone of interest adjacent to the vehicle. Radar sensors detect and locate objects by transmitting electromagnetic energy which reflects off of objects within the sensor field-of-view. The reflected signal returns to the radar sensor where it is processed to determine the round-trip travel time of the transmitted/received energy. The round trip travel time is directly proportional to the range of the target from the radar sensor. In addition to range determination, there are methods to determine azimuth (i.e. cross-range) location of detected objects such as multiple scanned/switched beams and monopulse implementations. Therefore, depending upon its complexity, the radar is capable of locating objects in both range and azimuth relative to the sensor location.

Based upon the reflected signals during a sampling of the entire field-of-view, a set of detection points is accumulated. Due to the nature of "reflections" collected by a remote sensor (whether a radar, laser, ultrasonic, or other active sensor), the set of detection points is representative of only certain spots on the object or objects present in the sensor's field-of-view. The detection points must be analyzed in order to determine what type of objects may be present and where such object is located.

Based on the type and location of detected objects, a blind spot detection or lane change aid system must decide whether a detection is one for which it should alert the driver. Under certain conditions, it may be undesirable to always generate an alert every time that any object is detected in the detection zone. For example, side-looking radar sensors will be subjected to reflections from common roadway structures such as guard-rails and roadside signs. These objects may not constitute a threat to which the driver desires to be alerted since they are stationary. However, due to the complexity of the driving environment, it has not been possible for a radar sensor to discriminate between the various driving scenarios without extensive processing and expensive sensor designs. It would be desirable to discriminate between objects for which an alert should or should not be provided using relatively simple sensors and without excessive computational resources.

Occupant safety systems are known that include pre-crash functions based on sensing an impending collision and taking advance actions to increase protection of the vehicle occupants. Potential pre-crash actions include pre-tensioning of seatbelts and adapting the deployment of airbags in response to the expected point of impact. Prior art pre-crash systems have employed forward-looking or rearward-looking radar wherein velocity of an object includes a radial component thereby permitting the detection and localization of objects based on Doppler measurements. In side-looking systems, any radial velocity is small and Doppler measurements are impractical. Nevertheless, the ability to determine a side location could be used to improve the pre-crash actions and to determine whether an object is in the predicted path of the vehicle (e.g., using steering angle information).

SUMMARY OF THE INVENTION

The present invention has the advantage of detecting a location of an object within a zone of interest to the side of a transportation vehicle using relatively simple and inexpensive remote sensors and signal processing.

In one aspect of the invention, a method is provided for classifying an object location of a 3-D object to a side of a transportation vehicle wherein the transportation vehicle moves along a front-to-rear directional axis and has a remote sensor mounted at a predetermined reference point. A set of detection points is identified substantially to the side of the transportation vehicle using the remote sensor. A detection point is found having a closest range to the vehicle reference point. The object is classified as on-center if a position $Y_{near}$ along the directional axis corresponding to the closest-range detection point is within a predetermined threshold distance from a position $Y_{zero}$ along the directional axis corresponding to the predetermined reference point. If not on-center, then the object is classified as spanning if a first position $Y_1$ along the directional axis and a second position $Y_2$ along the directional axis are on opposite sides of the position $Y_{zero}$. If not spanning, then the object is classified as front if any particular detection point is forward of the position $Y_{zero}$. If not spanning, then the object is classified as rear if any particular detection point is rearward of the position $Y_{zero}$.

BRIEF DESCRIPTION OF THE DRAWINGS

FIG. 1 is an overhead view showing a side-object detection zone of interest and a remote sensor field of view.

FIG. 2 shows coordinate systems for specifying locations within a field of view.

FIG. 3 illustrates monopulse radar transmission beams covering a field of view.

FIG. 4 illustrates a scanning/multiple switched beam radar transmission covering the field of view.

DETAILED DESCRIPTION OF PREFERRED EMBODIMENTS

Figure 5:
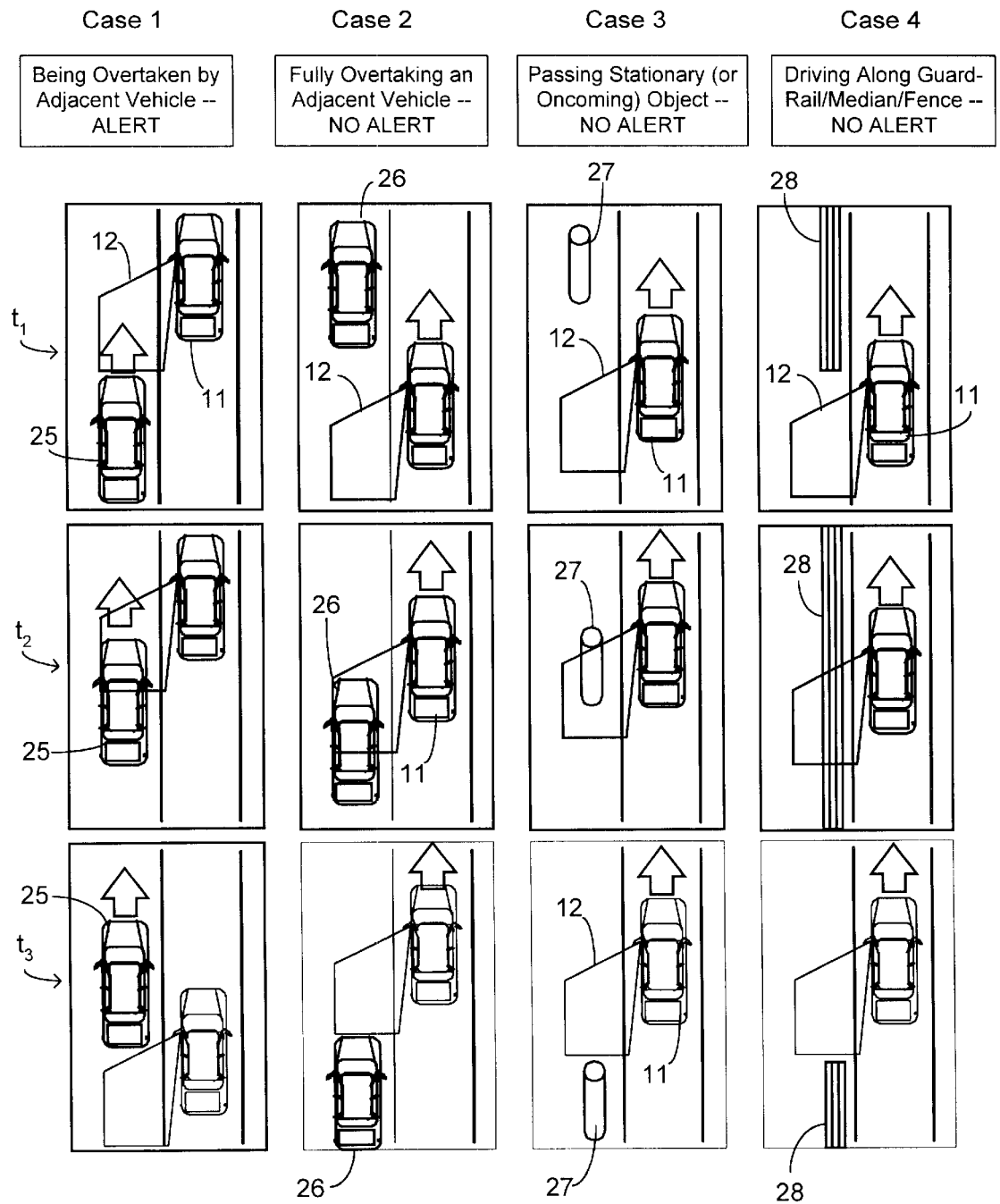
FIG. 5 is a graphic depiction showing various driving scenarios wherein objects are detected by a side-object detection system.

Referring to FIG. 1, a remote sensor 10 is mounted towards the rear of a vehicle 11 and is pointed generally in a direction perpendicular to the vehicle's direction of travel (i.e., the sensor is side-looking). By measuring range and bearing (or azimuth) to detected targets (i.e., sensed detection points) the side obstacle detection system can determine if an object is located within a zone of interest 12, also known as a detection zone. Sensor 10 typically has an actual field of view 13 which may encompass areas beyond zone of interest 12. Although a zone of interest is shown on only one side of vehicle 11, a typical side object detection system includes sensors deployed on both the left and right sides of a vehicle in order to cover blind spots on both sides of vehicle 11.

Sensor 10 may be comprised of a radar sensor, for example, and is capable of supplying at least two types of information: 1) range to detected targets, and 2) bearing (i.e., azimuth angle) to detected targets. As an added piece of information, the measurement of relative range rate via Doppler frequency shift can be utilized. The use of Doppler measurements has been used to identifying stopped objects using a radar sensor, however, it is of limited value in a side-looking case since the radar's field of view is generally perpendicular to the vehicle's direction of travel and any Doppler shift is minimal for objects in the zone of interest.

As shown in FIG. 2, when a detection point or target 15 is sensed within the sensor's field of view 13, a range 16 from sensor 10 and an azimuth angle 17 from a reference direction 18 (e.g., perpendicular from the side of vehicle 11) are determined using methods well known in the art in accordance with the type of remote sensor being employed. In a preferred embodiment of the invention, the coordinates of detection points are converted into X/Y Cartesian coordinates with the x dimension corresponding to perpendicular distance from a corresponding side of the vehicle and with the y dimension corresponding to parallel distance from a reference point, such as the position of the remote sensor.

In a preferred embodiment, targets are detected and localized using monopulse radar. An example beam pattern is shown in FIG. 3. A single-lobed radar pulse is transmitted and received alternately with a two-lobed radar pulse 21. As is known in the art, by comparing the reflection time (i.e., range) of target detections with the relative amplitudes of target detections at the same range, individual detection points can be located.

In an alternative embodiment shown in FIG. 4, a multiple beam radar sensor generates separate detection beams 22 directed at respective slices within field of view 13. A narrow radar beam or other beams such as a laser beam can also be electronically scanned across the field of view so that the beam direction at the time of detection directly gives the azimuth angle.

When a sufficient number of detection points have been sensed, the presence of an object in the zone of interest can be reliably determined. However, it is not usually desirable to initiate an alert (e.g., lighting a warning light or sounding an alarm) for every possible type of object that may be detected. In particular, stationary objects approach the vehicle from a forward direction within the driver's vision and no warning may be necessary or desired.

In general, there are two types of stationary objects that may enter the zone of interest: 1) those which are relatively short and spread over a small azimuth angle, such as sign posts, poles, and bridge pillars, and 2) those which have relatively wide longitudinal extent, such as concrete medians, guardrails, continuous roadside "clutter" such as groups of trees or berms. A challenge not satisfactorily met by the prior art is the need to distinguish stationary objects from moving vehicles in the zone of interest.

Various driving scenarios are shown in FIG. 5. In Case 1, vehicle 11 is overtaken by a faster moving vehicle 25. Thus, at a time $t_1$, vehicle 25 is approaching the rear edge of zone of interest 12. At a time $t_2$, vehicle 25 has entered zone 12 and is detected as an object within zone 12. By a time $t_3$, vehicle 25 has emerged from the front edge of zone 12 and is visible to the driver of vehicle 11. During the times that vehicle 25 is within zone 12, it is desirable to generate an alert notification or warning to the driver of vehicle 11.

In Case 2, vehicle 11 overtakes a slower moving vehicle 26. At time $t_1$, vehicle 26 is forward of vehicle 11 and can be seen by its driver. At time $t_2$, vehicle 26 is present in zone 12 but should not raise an alert if it is quickly overtaken, i.e., not present in a blind spot for more than a brief period of time. At time $t_3$, vehicle 26 has emerged from zone 12 so that no alert is to be produced.

A scenario involving a stationary object is shown in Case 3 wherein vehicle 11 passes a pole 27 situated off of the road surface. Pole 27 passes or tracks through zone 12 even more quickly than vehicle 26 since pole 27 has no forward motion. Since pole 27 does not constitute a hazard to vehicle 11, no alert should be initiated when it is present within zone 12.

Case 4 shows another scenario wherein a stationary object is comprised of a long structure such as a guardrail, a fence, or a roadway median. Vehicle 11 approaches a guardrail 28 at time $t_1$ and travels alongside guardrail 28 for a long distance as at time $t_2$. Eventually, vehicle 11 clears guardrail 28 at time $t_3$. No alert should be initiated for any such long, stationary structure.

Since the surfaces of any sensed objects may be irregular and can provide inconsistent return signals (e.g., the strength of radar reflections from a point on an object can be very sensitive to the angle of the incident radar waves), the sensed detection points in each of the foregoing scenarios are inherently noisy thereby making it difficult to distinguish one type of object from another. Specialized, high cost sensors and/or complex, resource intensive computer processing have previously been needed for classifying objects using remote sensor data. The present invention overcomes these difficulties using inexpensive sensors and processing together with an improved decision methodology for filtering out stationary objects so that an alert/warning is not initiated unless an object is reliably classified as a moving vehicle.

FIGS. 6–9 show example sets of detection points corresponding to different location types utilized by the present invention. The location types preferably include 1) On-center, which means that an object is directly alongside the host vehicle, whether stationary or moving, 2) Spans, which means that an object or objects are present in the zone of interest both forward and rearward of the sensor location, 3) Front, which means that an object is present in the forward portion of the zone of interest, and 4) Rear, which means that an object is present in the rearward portion of the zone of interest. This generalized location type can be combined with other target information in deciding whether to initiate an alert as described in co-pending application (V203-0086) or can be used to help identify appropriate pre-crash actions or otherwise provide useful side object information to assist in a higher level classification of an object.

Figure 6:
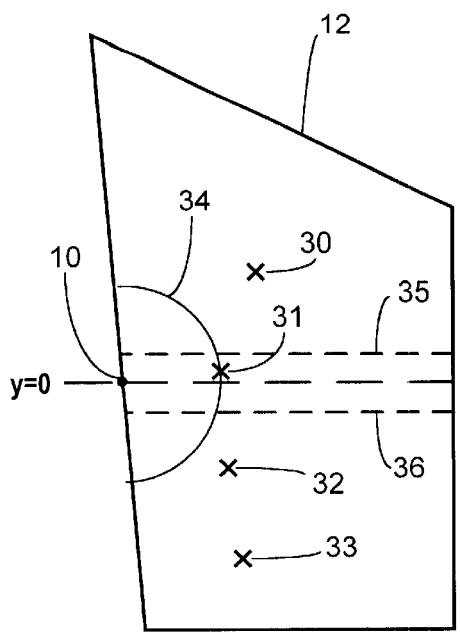
FIGS. 6–9 illustrate example sets of detection points corresponding to separate location types utilized in the present invention.

FIG. 6 shows detection points 30–33 corresponding to an on-center object within zone 12. Sensor 10 is located at a position on the host vehicle where Y=0. Certain objects such as another vehicle or a guardrail have a majority of their edges oriented parallel with the side edge of the host vehicle. Consequently, the part of the object which is closest to the sensor is in a direction from the sensor that is perpendicular to the side edge of the host vehicle. When there is an on-center object that persists for a time, then it is likely to be a vehicle or a long structure such as a guardrail. A measure of the object size and/or the stability of the object size can differentiate between a vehicle and a long structure.

In determining whether an object is On-center, a nearest range detection point is found. An arc 34 shows a range contour which contains the closest detection point 31. A value $Y_{near}$ which is the y coordinate of closest point 31 is determined and compared to center thresholds 35 and 36. If $Y_{near}$ is between the thresholds, then the location type is On-center.

Figure 7:
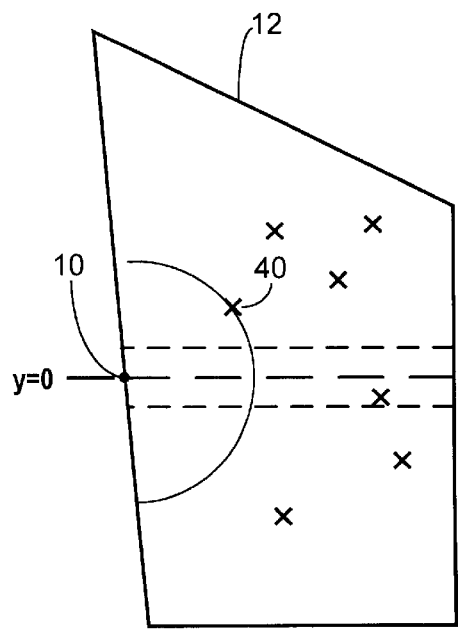

As shown in FIG. 7, a different set of detection points includes a closest detection point 40 at a range 37 having a value of $Y_{near}$ outside the center thresholds. Therefore, the location type is not On-center. Since there are detection points on both sides of y=0, the location type is Spanning. This may most likely indicate a clutter of objects (e.g., multiple road signs, trees, vegetation, or a berm) but can also indicate a vehicle (e.g., with the closest part of the vehicle being unreflective). Again, a measure of size and/or size stability can provide the differentiation between a vehicle and the other possibilities.

Figure 8:
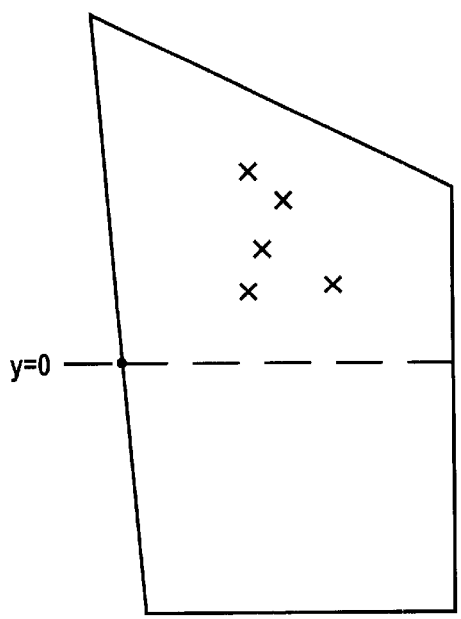
Figure 9:
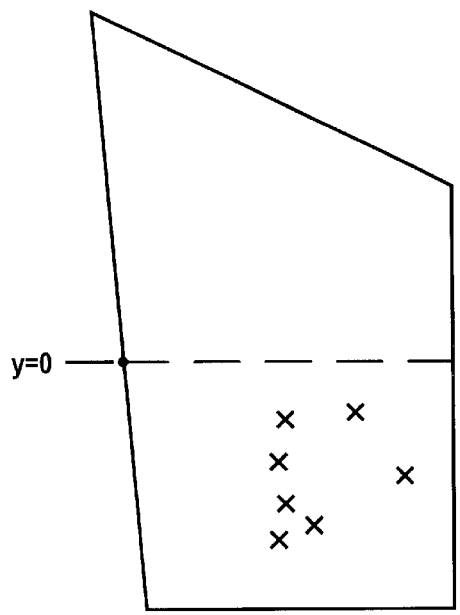

If an object is neither On-center nor Spans, then its location type will be either Front as shown in FIG. 8 or Rear as shown in FIG. 9.

Figure 10:
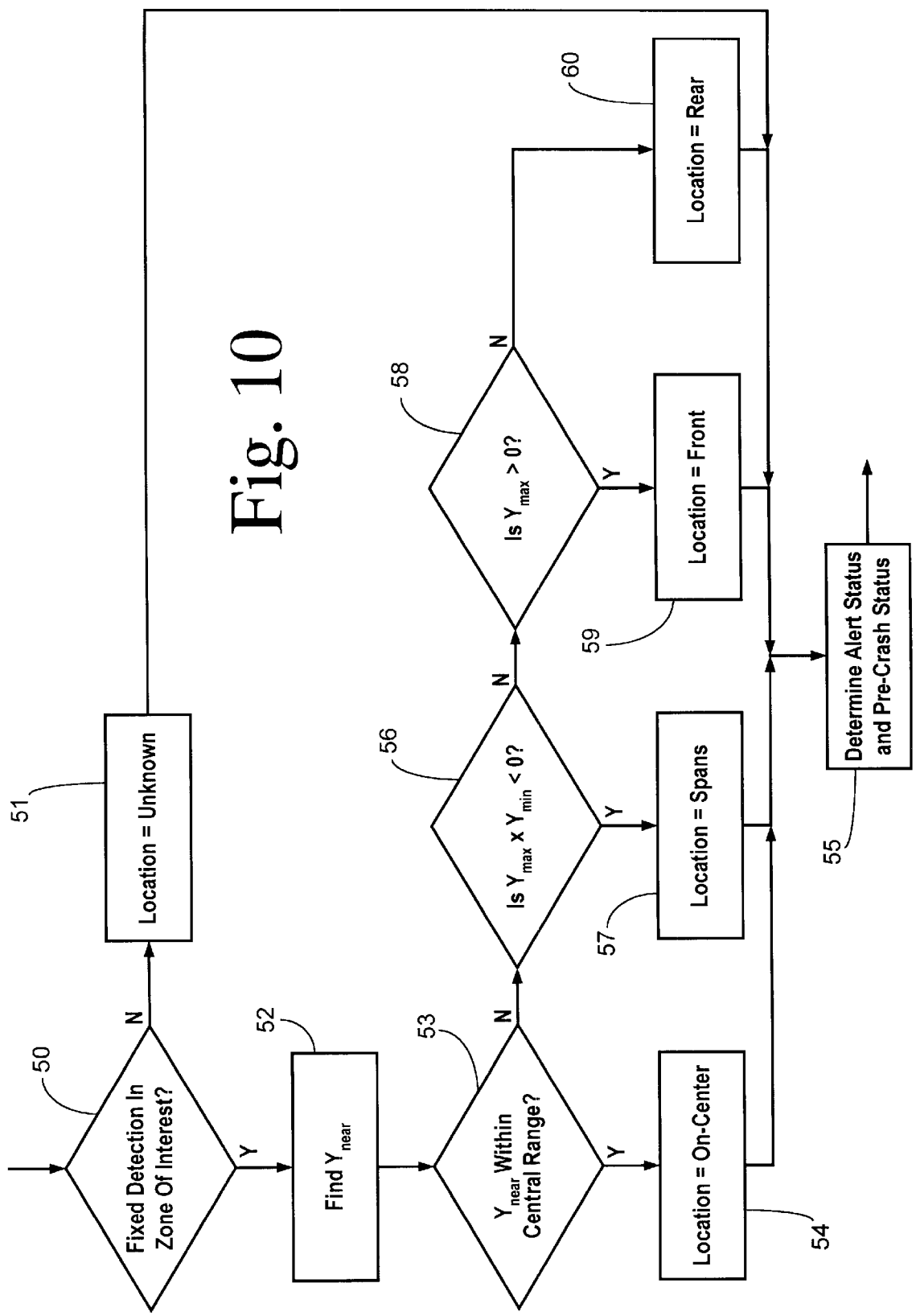
FIG. 10 is a flowchart of a preferred method of the present invention for determining location type.

The process for determining an object location is shown in greater detail in FIG. 10. In step 50, a check is made to determine whether at least one detection point has a fixed location within the zone. This step may be necessitated according to the type of remote sensor being used. With a monopulse radar, for example, it may be possible to have detection points with a known range but without a resolvable azimuth angle. Therefore, if the only available detection points cannot be fixed within the zone, then entry type is set to unknown in step 51.

As long as one fixed detection point is present, then the Y-coordinate value ($Y_{near}$) of the detection point nearest in range to the sensor location (at Y=0) is found in step 52. Generally, objects make their closest approach to the remote sensor when they directly outward from the sensor (i.e., are intersecting a line perpendicular to the host vehicle's direction of travel and originating at the sensor). Thus, a check is made in step 53 to determine whether $Y_{near}$ is within a central range centered on Y=0. If within this threshold range, then the location type is set to On-center in step 54 and further processing may be performed in step 55 to determine an alert status and/or determine any change in pre-crash actions.

If $Y_{near}$ is not within the threshold range, then a check is made in step 56 to determine whether $Y_{max}$ multiplied by $Y_{min}$ is less than zero (i.e., whether there are both positive and negative values of Y). If so, then location type is set to Spans in step 57. If not spanning, then step 58 compares any selected Y value or any detection point (e.g., $Y_{max}$ or $Y_{min}$) with zero to determine whether the location type is Front (step 59) or Rear (step 60).

Figure 11:
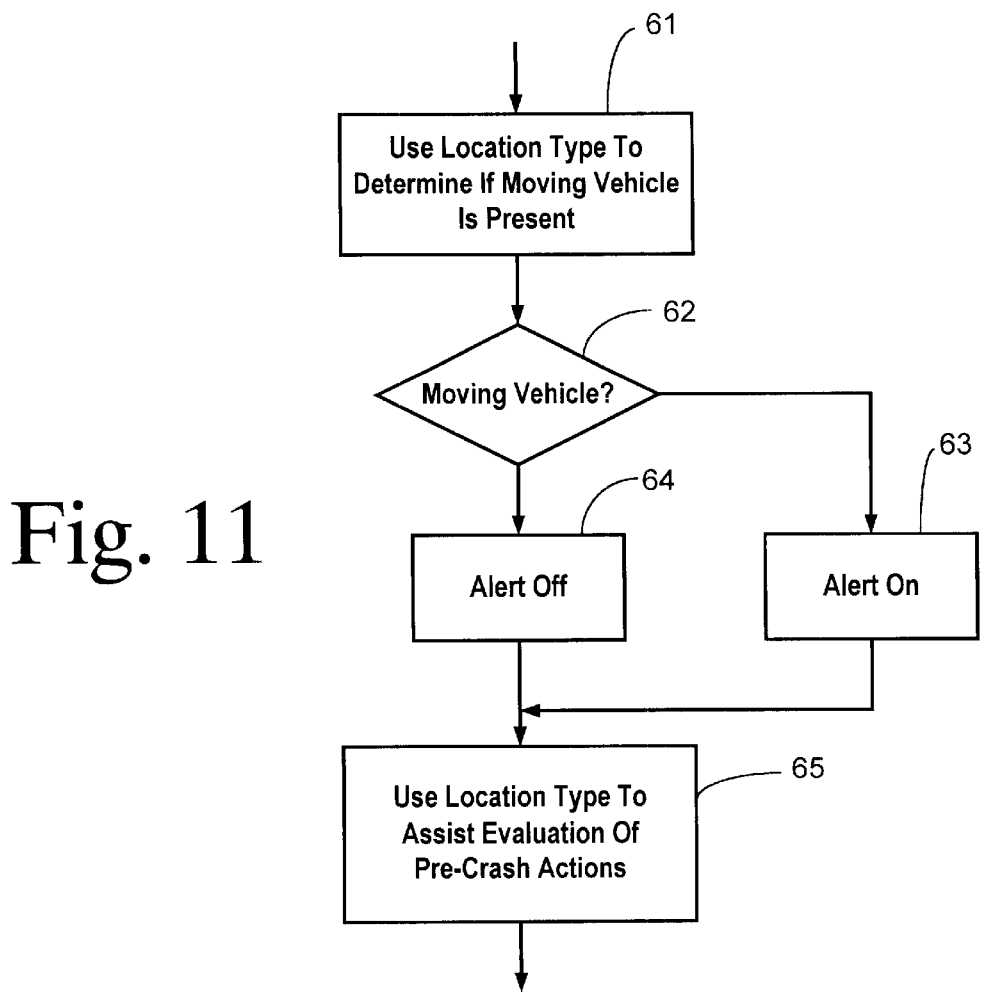
FIG. 11 is a flowchart showing utilization of location type by higher level functions.

The processing in step 55 is shown in greater detail in FIG. 11. In step 61, the location type is used to help determine if a moving vehicle is present (e.g., for a blind spot detector/land change aid). Step 62 checks to determine whether a moving vehicle was detected, and, if so, then a driver alert/warning is initiated in step 63. If not a moving vehicle, then the alert is turned off or remains off in step 64. In step 65, the location type is used to assist in the evaluation of pre-crash mitigation actions. Thereafter, additional sets of detection points are sampled and processed as shown in FIG. 10.

Figure 12:
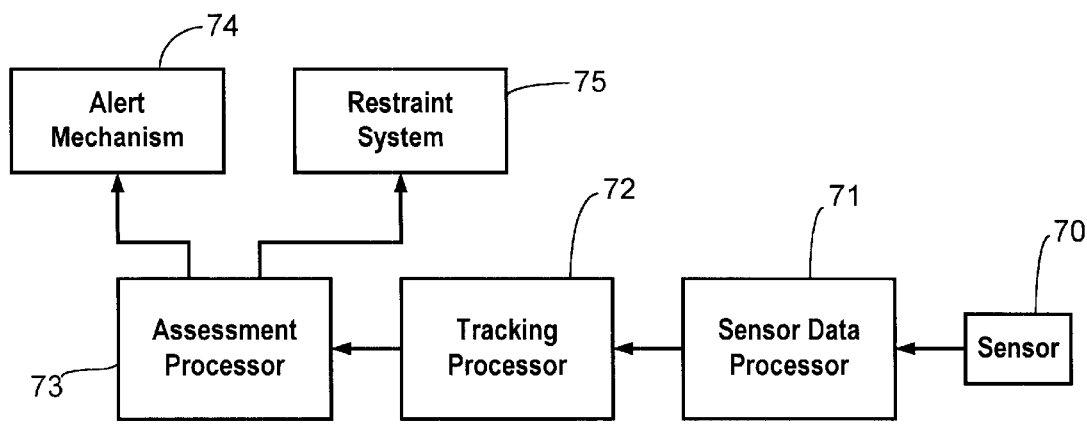
FIG. 12 is a block diagram showing a remote sensing system according to the present invention.

FIG. 12 shows a system block diagram including a sensor 70, such as a radar remote sensor including a lens, antenna, and transceiver, coupled to a sensor data processor 71. Raw sensor data from sensor 70 is processed by processor 71 to determine all detected scatterers within the sensor field-of-view and preferably to create a set of detection points including range, range rate, beam position, return signal strength, and time stamp information for each detection point. This information is provided to a tracking processor 72 and/or an assessment processor 73 that determine at least a location type for each set of detection points and use the location type with other information (such as track type and class type) to assess whether to initiate an alert mechanism 74 which may include visual or audible annunciators of a warning. Assessment information can also be provided to a restrain system 75 to facilitate pre-crash actions such as seatbelt pre-tensioning or airbag deployment.

What is claimed is:

1. A method of classifying an object location of a 3-D object to a side of a transportation vehicle, said transportation vehicle moving along a front-to-rear directional axis and having a remote sensor mounted at a predetermined reference point, said method comprising the steps of:

identifying a set of detection points substantially to said side of said transportation vehicle using said remote sensor;

finding a detection point having a closest range to said vehicle reference point;

classifying said object as on-center if a position $Y_{near}$ along said directional axis corresponding to said closest-range detection point is within a predetermined threshold distance from a position $Y_{zero}$ along said directional axis corresponding to said predetermined reference point;

if not on-center, then classifying said object as spanning if a first position $Y_1$ along said directional axis and a second position $Y_2$ along said directional axis are on opposite sides of said position $Y_{zero}$;

if not spanning, then classifying said object as front if any particular detection point is forward of said position $Y_{zero}$; and if not spanning, then classifying said object as rear if any particular detection point is rearward of said position $Y_{zero}$.

2. The method of claim 1 wherein each point of said set of detections points are all within a predetermined detection zone.

3. The method of claim 1 wherein said first position $Y_1$ comprises a position $Y_{max}$ along said directional axis corresponding to a farthest forward detection point and said second position $Y_2$ comprises a position $Y_{min}$ along said directional axis corresponding to a farthest rearward detection point.

4. The method of claim 1 wherein said set of detection points includes detection points sensed during a plurality of consecutive sample times.

5. The method of claim 4 wherein said object is classified as on-center only if each respective position $Y_{near}$ during each respective sample time is within said predetermined threshold distance from said position $Y_{zero}$.

6. The method of claim 4 wherein said remote sensor is comprised of a radar sensor and wherein each consecutive sample time corresponds to a radar scan of a predetermined detection zone.

7. The method of claim 6 wherein said radar scan is comprised of a monopulse radar scan.

8. The method of claim 6 wherein said radar scan is comprised of an electronically scanned radar beam.

9. The method of claim 6 wherein said radar scan is comprised of switched directional radar beams.

10. The method of claim 4 wherein said first position $Y_1$ and said second position $Y_2$ correspond to different ones of said consecutive sample times.

11. The method of claim 1 wherein said particular detection points are comprised of a position $Y_{max}$ along said directional axis corresponding to a farthest forward detection point.

12. The method of claim 1 wherein said particular detection points are comprised of a position $Y_{min}$ along said directional axis corresponding to a farthest rearward detection point.

13. The method of claim 1 further comprising the step of generating an alert indication to an operator of said transportation vehicle indicative of a moving vehicle in said detection zone in response to said classified object location.

14. The method of claim 1 further comprising the step of deploying a pre-crash mitigation measure in said transportation vehicle partly in response to said classified object location.

* * * * *